United States Patent
Vincenzo

(10) Patent No.: US 6,513,689 B2
(45) Date of Patent: Feb. 4, 2003

(54) MOTORBIKE TRANSPORT CASE PROVIDING CONTROLLED MOVEMENT OF A CLOSING MECHANISM

(75) Inventor: Visenzi Vincenzo, Rezzato (IT)

(73) Assignee: GI. VI S.r.l., Flero (IT)

(*) Notice: Subject to any disclaimer, the term of this patent is extended or adjusted under 35 U.S.C. 154(b) by 0 days.

(21) Appl. No.: 09/809,916

(22) Filed: Mar. 16, 2001

(65) Prior Publication Data
US 2001/0030215 A1 Oct. 18, 2001

(30) Foreign Application Priority Data
Mar. 21, 2000 (EP) .............................. 00106134

(51) Int. Cl.$^7$ ................................. B62J 7/00
(52) U.S. Cl. ................ 224/435; 224/412; 224/413; 224/433
(58) Field of Search ................ 224/435, 433, 224/412, 413; 190/109, 119, 121; 220/326, 263, 264, 835; 70/63, 71, 70

(56) References Cited

U.S. PATENT DOCUMENTS

| 5,353,946 A | * | 10/1994 | Behrend | 220/326 |
| 5,439,149 A | * | 8/1995 | Walter et al. | 190/117 |
| 5,924,533 A | * | 7/1999 | Cnockaert et al. | 190/109 |
| 6,006,558 A | * | 12/1999 | Peters | 70/63 |

FOREIGN PATENT DOCUMENTS

| DE | 4230972 A1 | 5/1993 |
| EP | 0370368 A2 | 5/1990 |
| EP | 0517265 A2 | * 9/1992 |
| EP | 0517265 A2 | 12/1992 |
| EP | 0709282 A1 | 5/1996 |

* cited by examiner

Primary Examiner—Stephen K. Cronin
Assistant Examiner—Maerena W. Brevard
(74) Attorney, Agent, or Firm—Summa & Allan, P.A.

(57) ABSTRACT

The invention relates to a motorbike transport case (TC) comprising a base part (1), arranged to be detachably fitted to a motorbike or a carrier plate (3) mounted on a motorbike; a lid part (2) hinged to the base part (1); a retaining member (10) arranged to hold the lid part (2) to the base part (1) and to release the lid part (2) from the base part (1); and a control mechanism for bringing the retaining member (10) from the first position to the second position.

Inadvertent closing may result in the retaining member (10) still not holding the lid part (2) to the base part (1). Therefore, it is an object to provide a motorbike transport case which obviates a user's negligence during closing of the transport case.

To this end, the control mechanism limits the movement of the retaining member (10) so that the retaining member (10) can be brought to the closing position only in such a manner that the retaining member (10) will actually hold the lid part (2) to the base part (1).

10 Claims, 9 Drawing Sheets

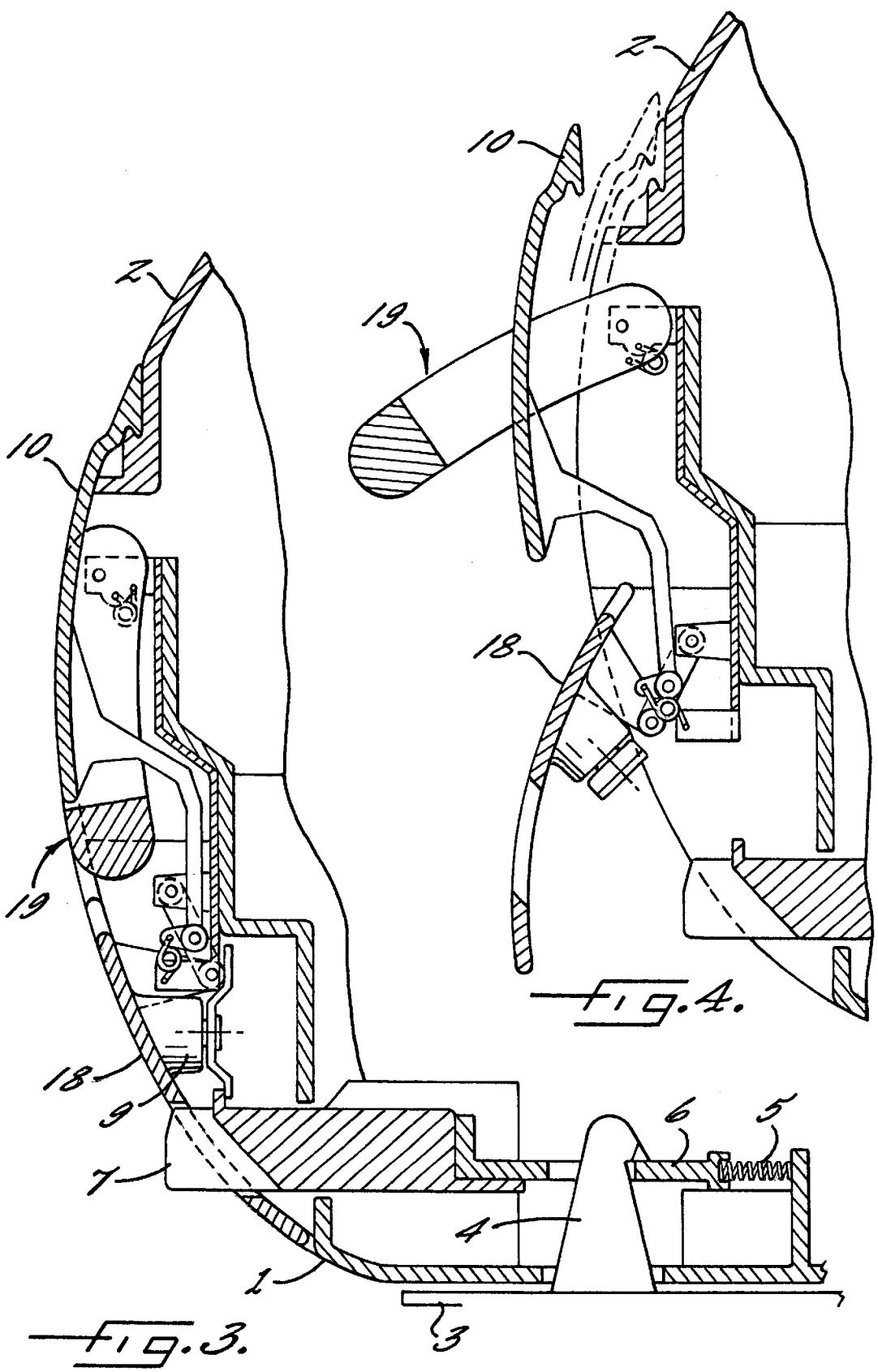

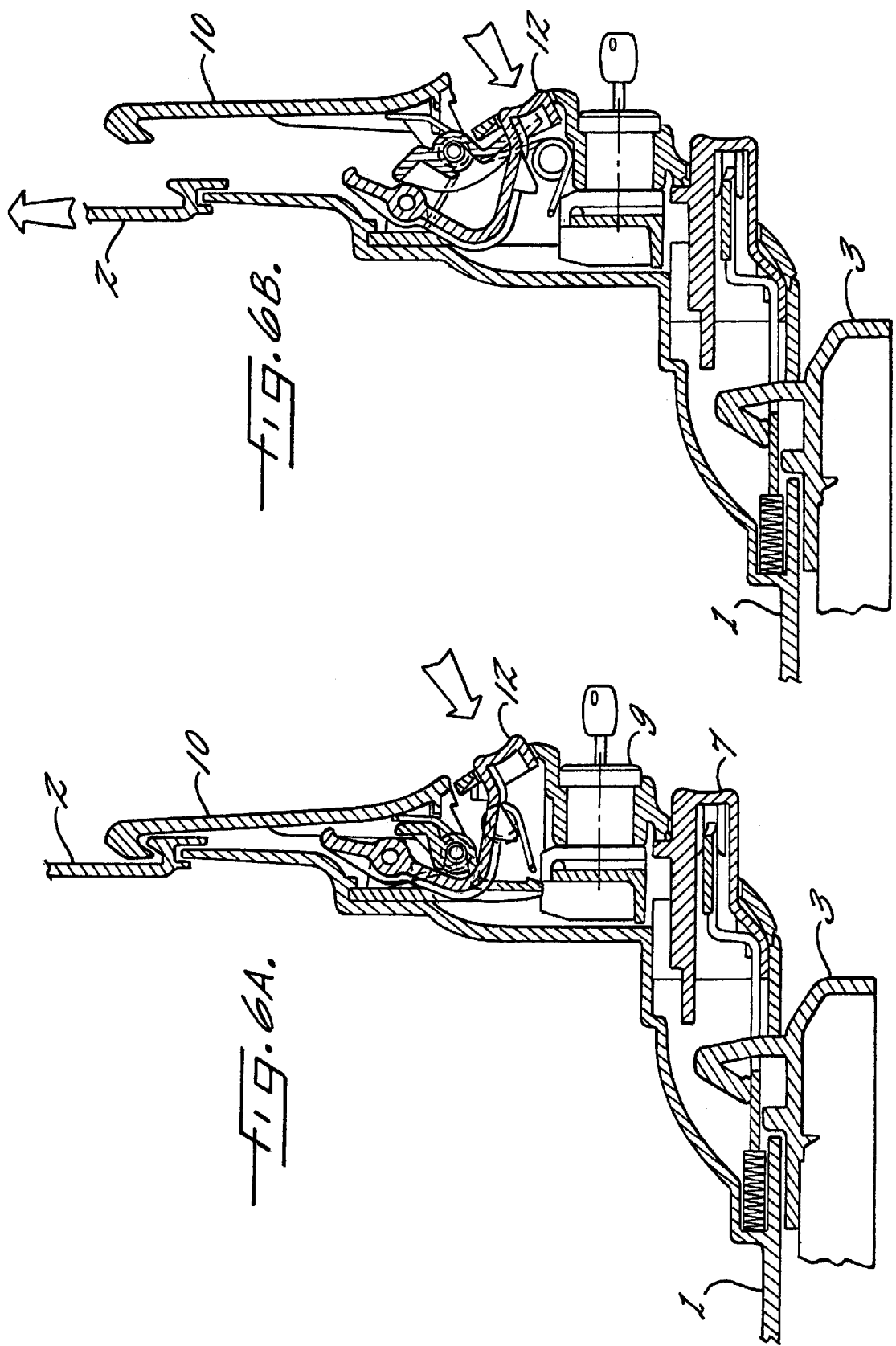

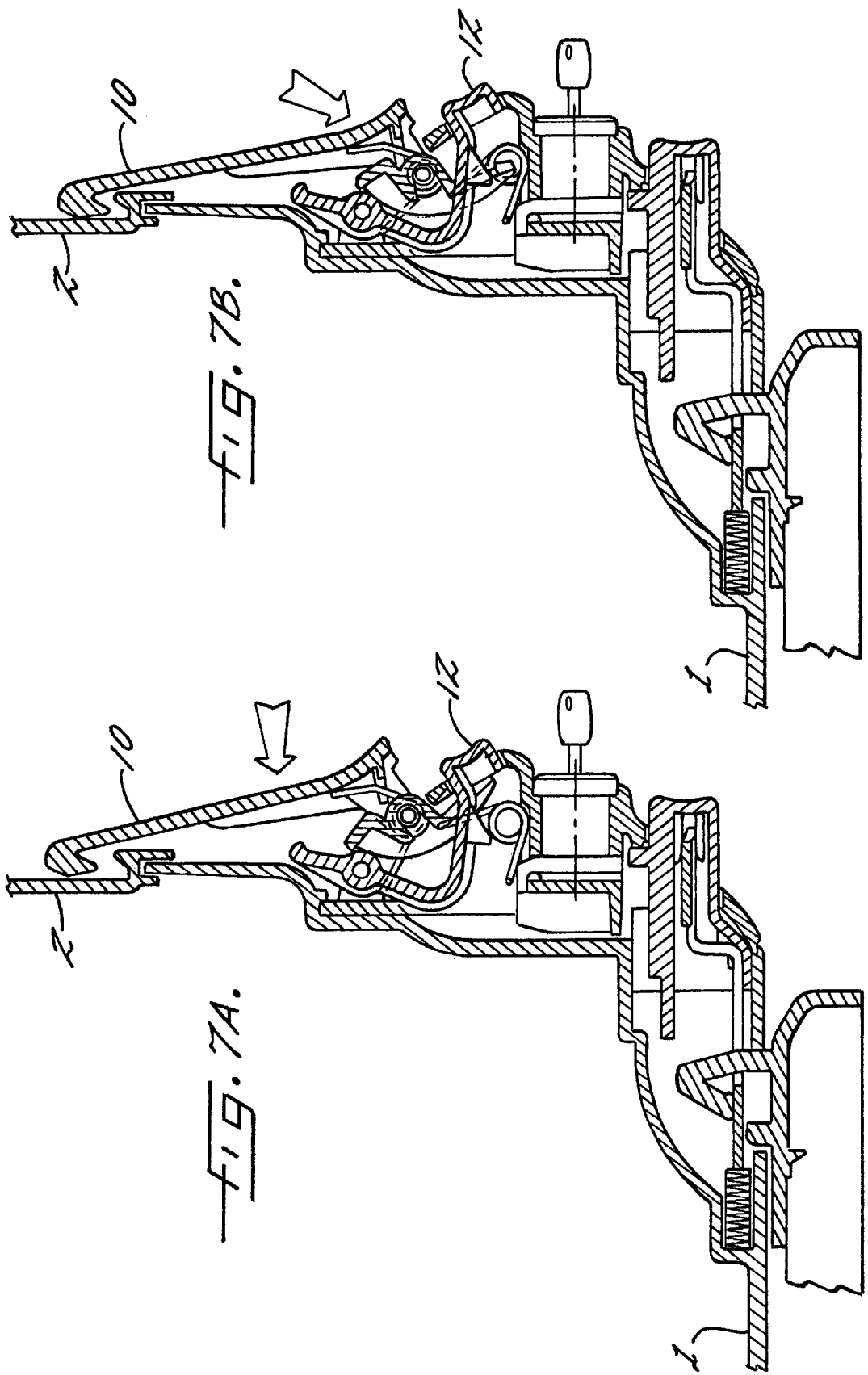

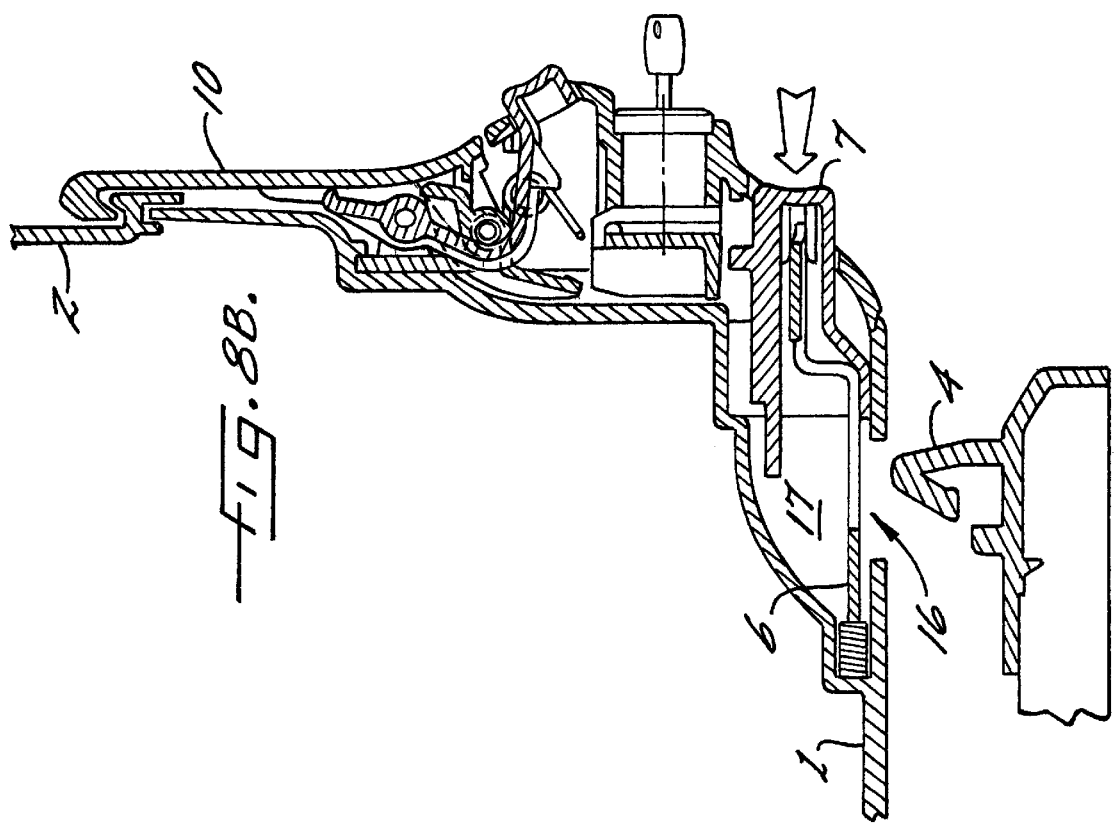
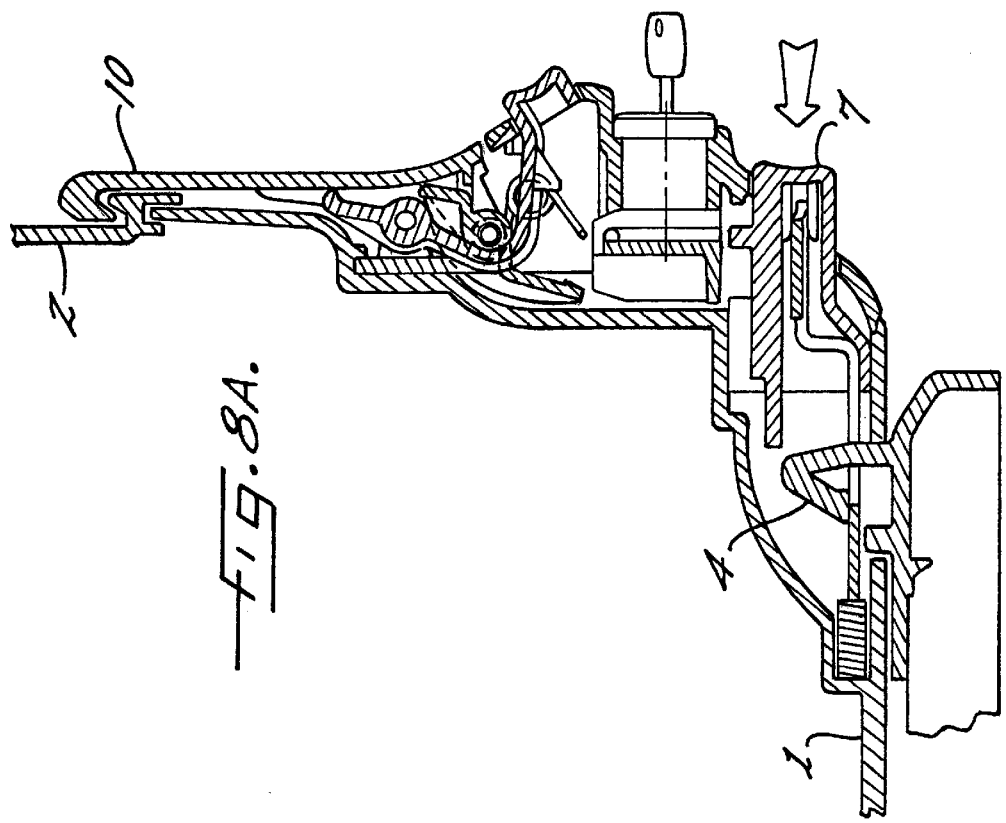

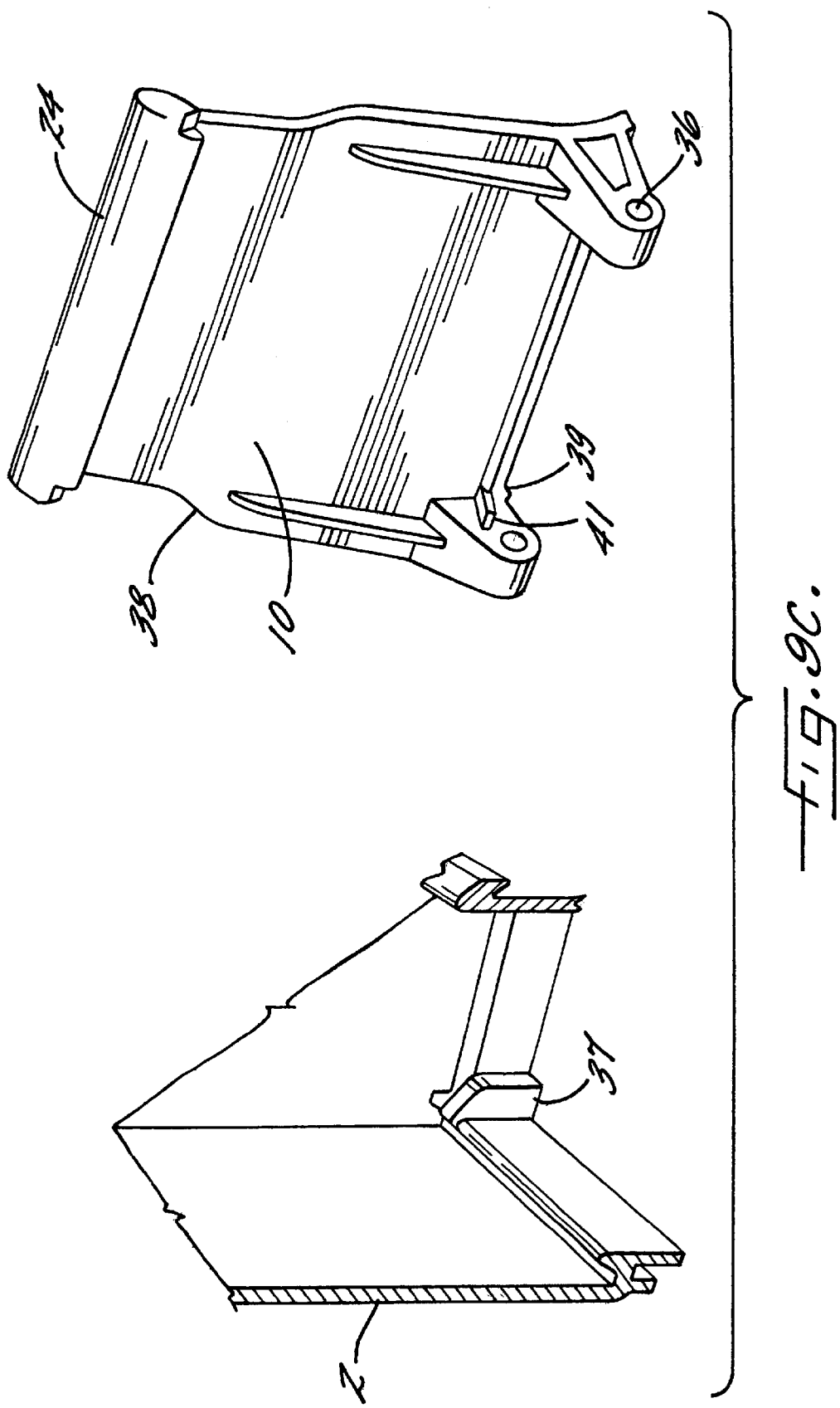

MOTORBIKE TRANSPORT CASE PROVIDING CONTROLLED MOVEMENT OF A CLOSING MECHANISM

The invention relates to a motorbike transport case comprising:
- a base part arranged to be detachably fitted to a motorbike or a carrier plate mounted on a motorbike (the term "motorbike" as used in this specification encompassing motor scooters);
- a lid part hinged to the base part such that the lid part can be pivoted away from the base part to open the transport case and pivoted toward the base part to close the transport case;
- a retaining member arranged to selectively assume a first position, in which the retaining member can hold the lid part to the base part, and a second position, in which the retaining member cannot hold the lid part to the base part; and
- a control mechanism for bringing the retaining member from the first position to the second position.

A motorbike transport case of this type is described in the applicant's previous patent applications EP-A-0 370 368 and EP-A-0 517 265. Further pertinent prior art examples include EP-A-0 709 282, DE-A-42 30 972, and the applicant's earlier European patent application 99123097.0 (filed on Nov. 22, 1999 but not published before the filing date of the subject invention).

As has been well-known in the art, transport cases that can be fitted detachably to a motorbike provide versatility in that the user may employ such a case either separately from a motorbike, e.g. while walking as a pedestrian or working in an office, or in a fitted state, i.e. when driving a motorbike to which the transport case has been fitted so that the user does not have to hold the case manually.

While the conventional detachable transport case thus provides considerable convenience to the user, the following problem may arise during closing of the transport case. In the prior art transport case, the retaining member is arranged to move vertically up (from a first to a second position) and down (from the second to the first position) to open and close the transport case, respectively. In the second position, the retaining member can be pivoted through a relatively wide angle with respect to the lid parts. Consequently, when the retaining member is brought from the second (upper) position (=open transport case) to the first (lower) position (in which the transport case is supposed to be closed), inadvertent operation may result in the retaining member still not holding the lid part to the base part, because the retaining member (e.g. a hook-shaped profile thereof) may not be engaging the lid part (e.g. an edge thereof) even though the retaining member has been moved to the first position. In other words, the transport case is not firmly closed although the user has brought the retaining member to the first position which normally serves to hold the lid part to the base part of the transport case. As the retaining member has reached the first position, the user may erroneously assume that the transport case is securely closed when in reality it is not. Driving a motorbike with a loose lid part of the transport case may result in objects being lost from the transport case on the road.

Further, the retaining member may be locked (e.g. by turning a key) in the first position even where the retaining member does not actually hold the lid part to the base part of the transport case. The user may therefore erroneously assume that the transport case is closed and locked up when in reality it is not. Parking a motorbike with an unsecured lid part of the transport case may result in objects being stolen from the transport case due to insufficient or negligent closing before locking.

Therefore, it is a first object of the application to provide a motorbike transport case of the abovementioned type which obviates a user's negligence during closing of the transport case.

U.S. Pat. No. 5,924,533 addresses a similar problem for a luggage case and proposes a closing mechanism which comprises cam surfaces causing the retaining member to execute first a rotational movement and then a translational movement drawing the lid and base parts together. However, the lever mechanism provided is rather complicated and requires sufficient space to open the transport case because in use the lever mechanism projects out of the transport case.

Therefore, it is a second object of the application to provide a motorbike transport case of the abovementioned type having a simple and less cumbersome opening mechanism.

According to the invention, these objects are achieved by the following additional features:
- the control mechanism comprises an opening means, in particular a push button, which is arranged to be depressed to enable the retaining member to be brought from the first position to the second position; and
- the control mechanism allows the retaining member to be brought from the second position to the first position only in such a manner that the retaining member actually holds the lid part to the base part when the retaining member has reached the first position.

Movement of the retaining member is limited by the control mechanism such that the retaining member can be brought to the first position only after the retaining member has been oriented to join the lid and base parts of the transport case. In this advantageous manner, the user is effectively reminded to apply the retaining member properly to the part to be engaged (normally the lid part) before he/she brings the retaining member to the first position in which the retaining member will hold the lid and base parts together. In other words, the user cannot bring the retaining member to the first position without fastening the lid part to the base part.

An advantageous feature of the motorbike transport case resides in that the control mechanism comprises a specific opening means, in particular in the form of a push button, which is arranged to be depressed to enable the retaining member to be brought from the first position to the second position. For example, operation of the opening means may snap the retaining member out of the first position so that the user can shift the retaining member to the second position by exerting manual pressure and/or a frictional force on the retaining member. Alternatively, operation of the opening means may release a spring that automatically urges the retaining member to the second position.

The concept of using a push button or other compact opening means that acts on the retaining member (to bring it to the second position) is an advantageous aspect of the invention and is realised in combination with the control mechanism which is arranged to limit the return movement of the retaining member (i.e. when returning to the first position). Using a push button or other compact opening means (rather than a pivotable locking plate as the one used in EP-B1-0 517 265) enables a particularly compact and tamper-proof design of the closing mechanism.

A push button represents an advantageous implementation of the opening means in that it allows a simple, solid and compact construction of the opening/closing apparatus comprising the retaining member and control mechanism. The opening/closing apparatus may comprise fewer components, is easy to manufacture and provides enhanced security because the solid and compact construction of the opening/closing apparatus is less vulnerable to burglary.

Generally, the retaining member may be secured to either transport case part (base part or lid part) and arranged to selectively engage and release the other part when the retaining member is in the first or second position, respectively. In a presently preferred embodiment, however, the retaining member is secured to the base part and arranged to engage and release the lid part. For this purpose, the retaining member may comprise a hook-shaped end adapted to engage an edge of the lid part.

In a particularly preferred embodiment, the retaining member is articulated to the base part and, in the second position, can be pivoted selectively towards the lid part to engage it and away from the lid part to release it, and the control mechanism allows the retaining member to be brought from the second position to the first position only when the retaining member has been pivoted towards the lid part. Such a pivotable structure of the retaining member advantageously defines two clear situations which the control mechanism can distinguish in order to allow or prevent movement of the retaining member into the second position thereof.

In a particularly preferred embodiment, the opening means is in a first state when the retaining member is in the first position, and the opening means is in a second state when the retaining member is in the second position. In this manner, the state of the opening means advantageously indicates the state of the retaining member. For example, a push button acting as the opening means may project from the base part only when the retaining member is in the first position. The push button is depressed to bring the retaining member to the second position (in order to open the transport case) and will keep the depressed state as long as the retaining member is in the second position. When the retaining member is brought back to the first position, the push button is returned to its projecting state indicating that the retaining member has properly assumed the first position. If the push button does not project from the base part, the user knows that the transport case has not been closed correctly. The information to the user may be enhanced by tactile or acoustic feedback, e.g. by a snap action of the control mechanism and/or push button (or other opening means) when the retaining member is returned properly to the first position.

Preferably, the control mechanism or an opening means acting on the control mechanism may be selectively locked and unlocked, preferably by turning a (mechanical) key in a lock. Alternatively, operation of the lock may require some special tool, combination code number, electronic key or the like. Where a mechanical key is used, the lock may be preferably arranged to release the key only in the locked state so that the user is reminded to lock the transport case before he/she can withdraw the key.

In order to fit the transport case to a motorbike (or to a carrier plate mounted on a motorbike), the motorbike transport case may be arranged (in a manner known per se) such that a wall portion of the base part comprises an aperture for receiving a fitting extension of a support structure of a motorbike;

the base part comprises a fitting latch arranged to couple the base part to a received fitting extension; and the base part comprises a detaching means, in particular a push button, arranged to release the fitting latch from a received fitting extension.

In the context of the subject invention, the detaching means and the opening means may be generally implemented by a single component (e.g. a single push button). However, in the presently preferred embodiment of the transport case, the opening means is separate from the detaching means. By using two separate means for detaching and opening the transport case, these two functions can be implemented and performed easily by both the manufacturer and user.

As mentioned above, a lock (e.g. a key-operated lock) is preferably provided for selectively locking and unlocking the control mechanism or an opening means acting on the control mechanism. Another lock or preferably the same lock may be advantageously used to selectively lock and unlock the fitting latch or the detaching means acting on the fitting latch. Preferably, operation of a single lock secures both the transport case to a motorbike and the lid part to the base part, thus preventing unauthorised persons from detaching and/or opening the transport case. In a particularly preferred arrangement, a single lock is used that has only two positions: a locked position and an unlocked position. In the locked position, the transport case cannot be detached nor opened. In the unlocked position, the transport case can be detached and/or opened. Preferably, the key can be withdrawn only in the locked position of the lock. In an alternative arrangement, a single lock is used that has at least three positions: a locked position, a partially unlocked position, and a completely unlocked position. In the locked position, the transport case cannot be detached nor opened. In the partially unlocked position, the transport case can be opened but cannot be detached (or can be detached but cannot be opened). In the completely unlocked position, the transport case can be opened and/or detached.

Further features and advantages of the invention will become apparent from the description of a preferred embodiment given below with reference to the accompanying drawings wherein FIG. 1 is a perspective view of a conventional motorbike transport case in the closed state thereof;

FIG. 3 is a sectional view of a closing mechanism of the conventional transport case, with the closing mechanism being in a first (or closed) state in which a retaining member holds a lid part to a base part of the transport case;

FIG. 4 is a another sectional view of the closing mechanism of the conventional transport case, with the closing mechanism being in a second (or open) state in which the retaining member does not hold the lid part to the base part of the transport case;

FIGS. 6A and 6B are sectional views of the closing mechanism according to the invention, with the closing mechanism being opened in two steps so that the retaining member is brought to a second position in which the retaining member does not hold the lid part to the base part of the transport case;

FIGS. 7A and 7B are sectional views of the closing mechanism according to the invention, with the closing mechanism being closed in two steps so that the retaining member is returned to the first position in which the retaining member holds the lid part to the base part of the transport case;

FIGS. 8A and 8B are sectional views of the closing mechanism according to the invention, wherein a latch is released to detach the transport case from a support structure of a motorbike.

FIGS. 9A to 9C are detailed views of individual components of the closing mechanism.

Figure 1:
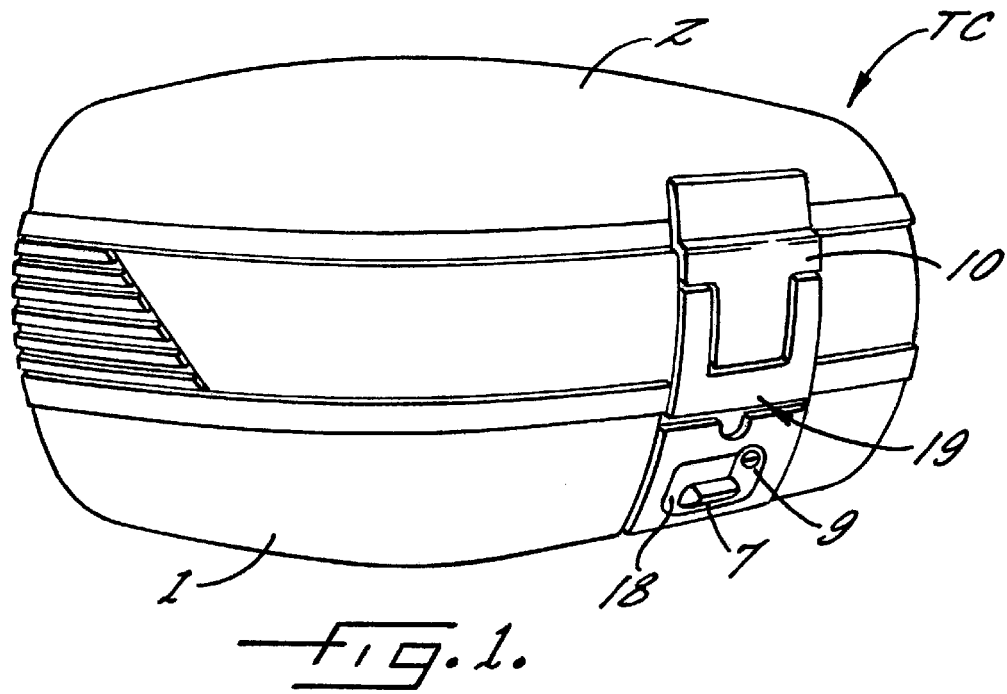
Figure 5:
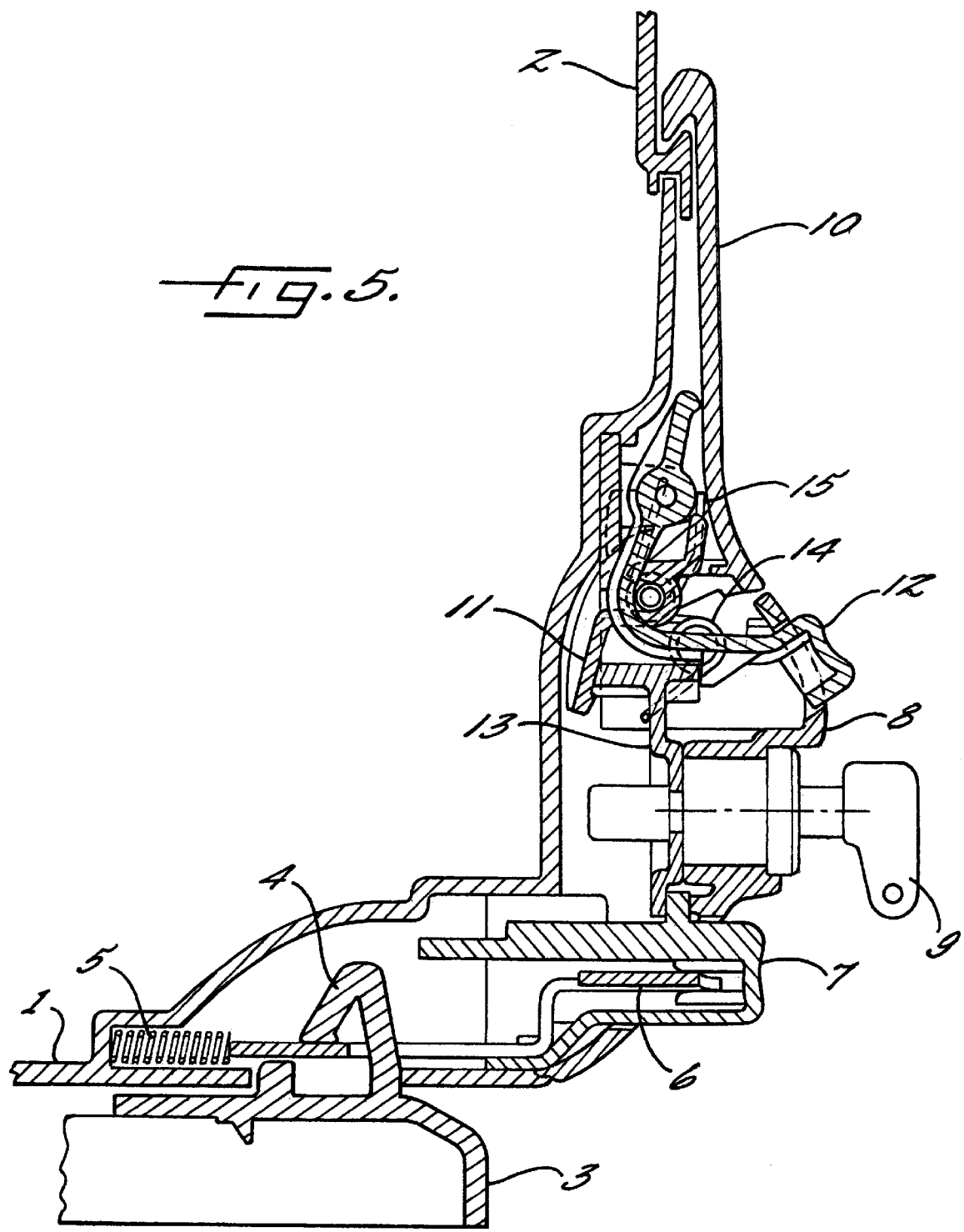
FIG. 5 is a sectional view of a closing mechanism according to the present invention, with the closing mechanism being in a first (or closed) state in which a retaining member holds a lid part to a base part of the transport case.

A transport case TC as illustrated schematically in FIG. 1 can be fitted detachably on a support structure 3 of a motorbike (the term motorbike including motorscooters). The transport case TC is fitted preferably on the top surface of a support structure, as shown in FIGS. 3 and 5, for example. In that arrangement, the transport case TC may also be referred to as a top case. The transport case TC comprises a base part 1 which may be referred to as the bottom half-shell (assuming that the base part 1 is the lower part of a top mounted transport case), or just bottom shell. The transport case TC further comprises a lid part 2 which may be referred to as the top half-shell (assuming that the lid part 2 is the upper part of a top mounted transport case), or just top shell. Incidentally, the term "half-shell" as used herein does not imply that the lower and upper parts 1 and 2 of the transport case TC have to have the same size. While the base part 1 is shown to be fitted substantially horizontally to the support structure 3 of the motorbike, the subject application also contemplates alternative arrangements in which the base part 1 may be fitted in any other orientation, e.g. to a substantially vertical structure of the motorbike. In either case, the lid part may be hinged to the base part such that the lid part is pivotable about a horizontal axis or a vertical axis. Likewise, the transport case is not restricted to being fitted to the rear structure of a motorbike. The invention also contemplates transport cases for use on lateral or front structures of a motorbike.

Figure 2:
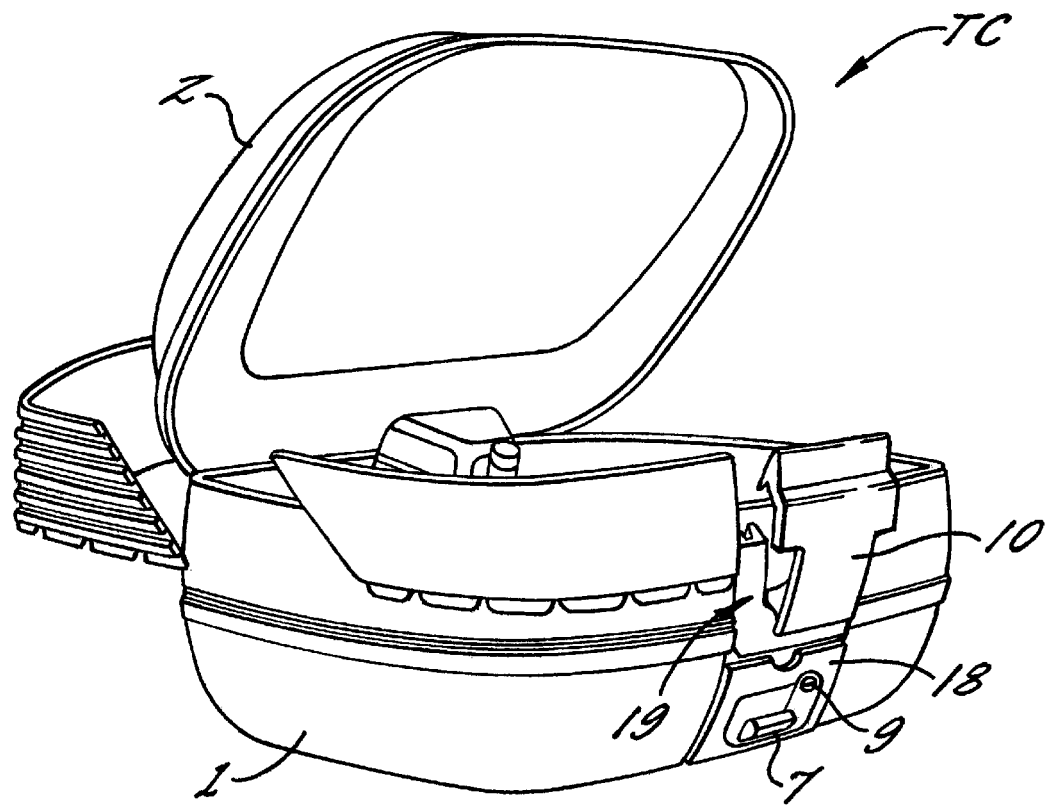
FIG. 2 is a perspective view of the conventional transport case in the open state thereof.

Referring to FIGS. 1 and 4, the transport case may comprise a retractable handle 19. With further reference to FIG. 2, the lid part 2 may be hinged to the base part 1 such that the transport case (top case) TC can be opened by pivoting the lid part 2 upwardly from the base part 1 once a locking mechanism has been unlocked and a closing mechanism has been opened (as described in greater detail below). Conversely, the transport case TC can be closed by pivoting the lid part 2 downwardly onto the base part 1 where the lid part 2 can be held by a retaining member of the closing mechanism and locked by the locking mechanism.

A conventional closing mechanism (EP-B1-0 517 265), as best shown in FIGS. 3 and 4, comprises a retaining member 10 which in a first or closed position (FIG. 3) holds the lid part 2 to the base part 1 of the transport case. For this purpose, the end portion of the retaining member may be hook-shaped (in cross-section) to engage a corresponding edge of the lid part 2. When a locking plate 18 is pivoted upwardly (away from base part 1), the retaining member is lifted to a second or open position (FIG. 4) in which the user can release the retaining member from the edge of lid part 2 to open the transport case. The conventional closing mechanism has a complicated and fragile structure (comprising various hinges and a locking plate in addition to the retaining member) and is thus vulnerable to violence by a burglar. Further, when the closing mechanism is to be closed by lowering the locking plate and the retaining member, the retaining member may not be engaging the edge of lid part 2 although the retaining member as such has been lowered to the first position. Consequently, the transport case may not be firmly closed if a user inadvertently lowers the locking plate and retaining member without pressing the hook-shaped end of the retaining member properly onto the engagement edge of lid part 2.

Figure 9A:
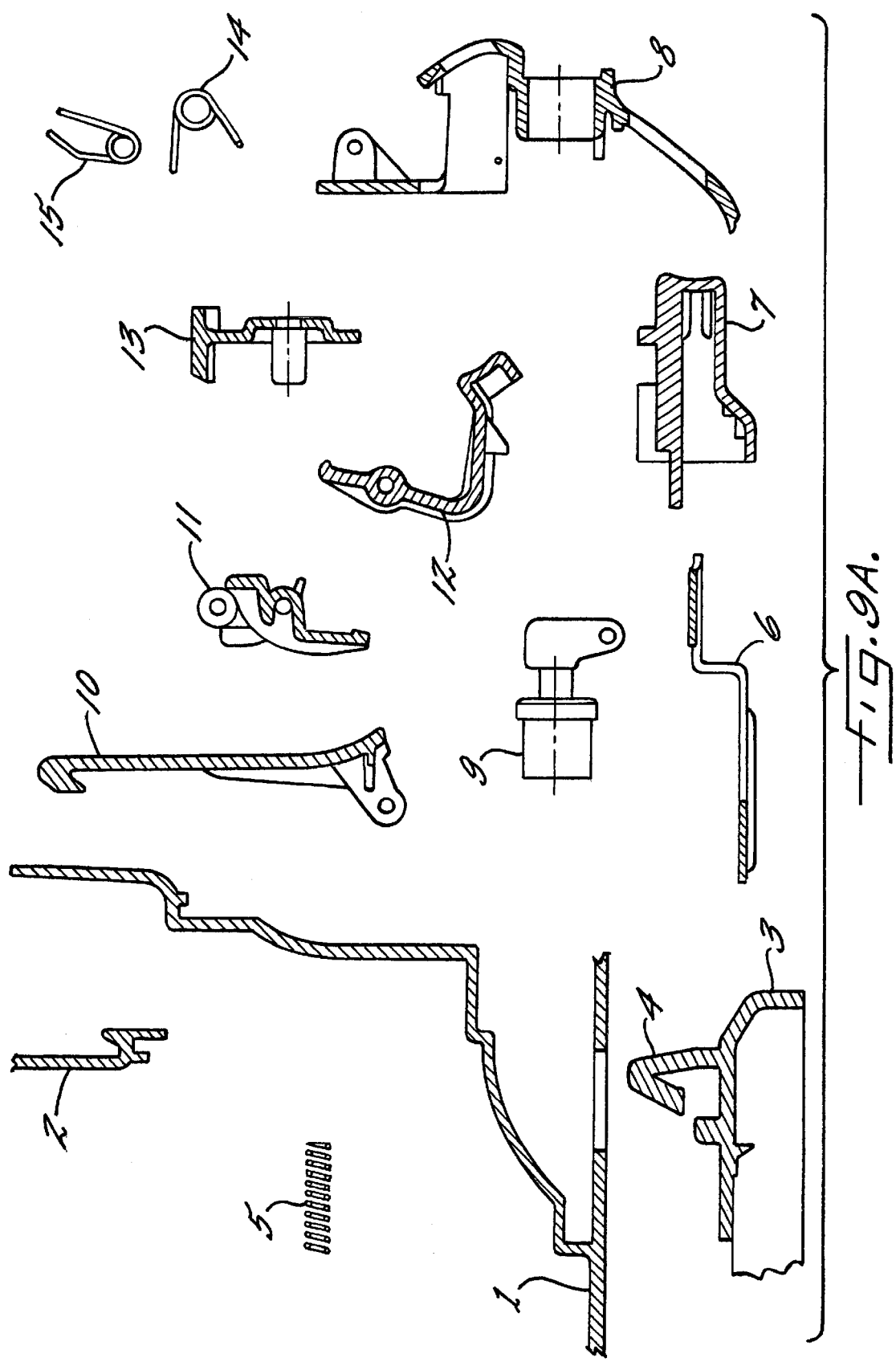
Figure 9B:
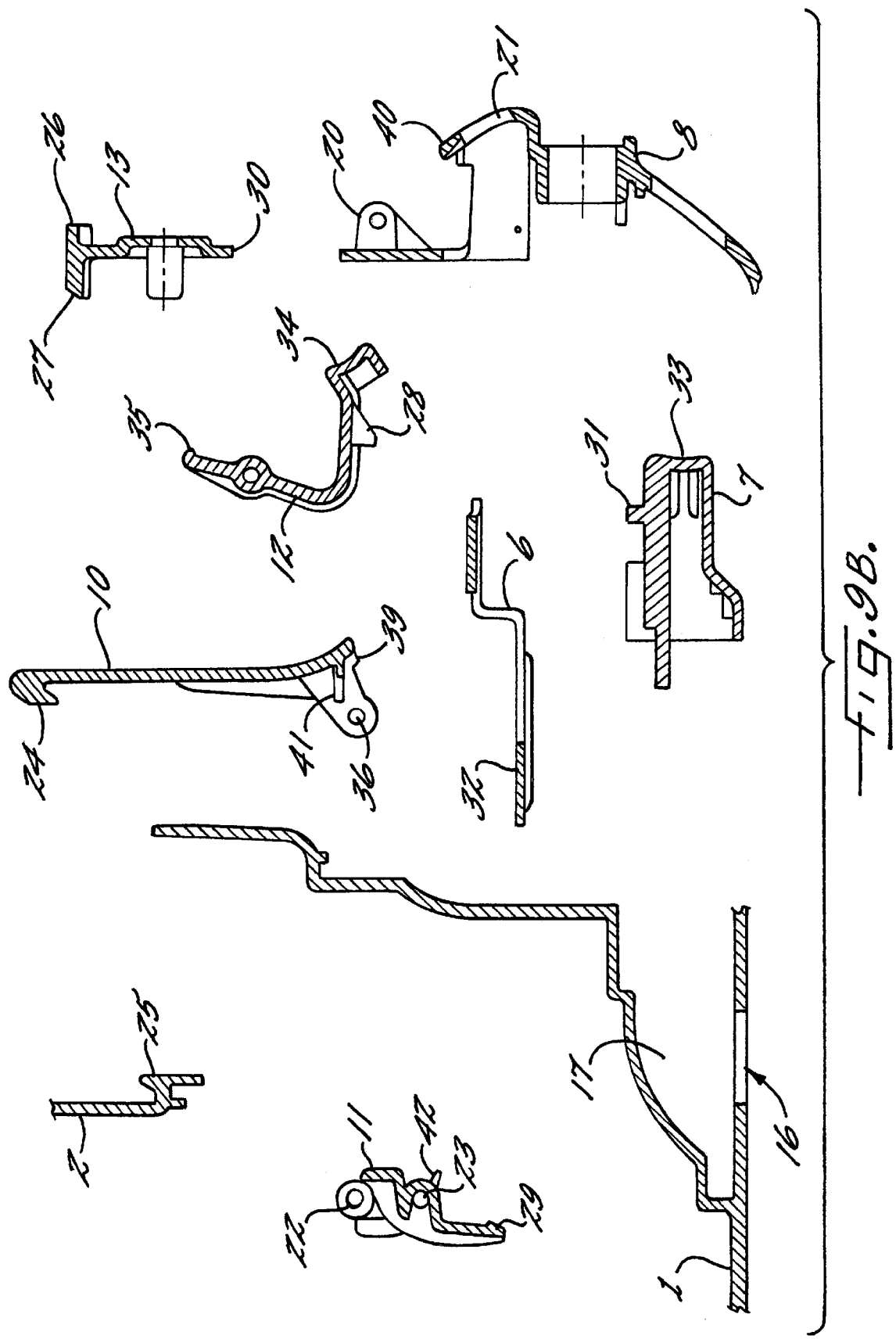

In the following, an exemplary implementation of the closing and locking mechanisms of the transport case TC of the invention will be described in greater detail. Like parts are denoted by same reference numerals throughout the description. For clarity and completeness, the various components constituting the closing and locking mechanisms are also shown individually in FIGS. 9A, 9B and 9C.

FIG. 5 is a sectional view of a closing mechanism according to the present invention, with the closing mechanism being in a first (or closed) state in which a retaining member 10 is seated in a first (or closed or lower) position and holds the lid part 2 to the base part 1 of the transport case. For this purpose, a preferably hook-shaped end of the retaining member 10 engages a complementary edge of the lid part 2.

According to one aspect of the invention, in order to open the transport case (FIGS. 6A and 6B), the user manually depresses a push button 12 (as indicated by an arrow) which causes the retaining member 10 to be lifted to a second (or upper or open) position where the hook-shaped end of the retaining member 10 can be disengaged, e.g. pivoted, from the edge of lid part 2. The disengaging movement may be achieved automatically if the retaining member 10 is spring-loaded (e.g. by a torsion spring 15 or a pair of torsion springs 15) and if depression of the push button 12 releases the retaining member 10 from a snapped-in position, for example.

In order to close the transport case (FIGS. 7A and 7B), the retaining member 10 has to be returned to its first (or lower) position. In accordance with another major aspect of the invention, the retaining member 10 starting from the situation shown in FIG. 6B cannot be shifted immediately downwards to the lower position because the control mechanism that determines the path of travel of the retaining member 10 is arranged to prevent downward movement of the retaining member 10 unless the latter has pivoted back toward the lid part 2 to engage the edge thereof. The skilled person is able to limit the downward movement of the retaining member 10 in various ways.

Hence, to close the transport case, the user first has to pivot the retaining member 10 towards the lid part 2 (arrow in FIG. 7A) so that the upper end of the retaining member 10 abuts on the lid part 2. Only then can the retaining member 10 be urged back to its first (or lower) position by applying a manual force along the arrow indicated in FIG. 7B to finally return to the first position shown in FIG. 5.

Preferably, the push button 12 projects outwardly from a rear wall 8 of the base part 1 when the retaining member 10 is in the first position (FIG. 5). Once the push button 12 has been depressed to expel the retaining member 10 from the first position, the push button 12 projects to a smaller extent (FIG. 6A) or may be even flush with said rear wall 8 (FIG. 6B), thus indicating that the retaining member 10 is not seated in the first position. When the retaining member 10 is returned properly to the first position, the push button 12 is urged outwardly to its maximum projection (FIG. 5), thus indicating visually that the retaining member 10 is actually seated in the first position. A snap action of the closing mechanism and/or push button 12 may occur when the retaining member 10 is being received in the first position. In that case, an acoustic and/or tactile feedback is provided to the user so that he/she knows that the retaining member 10 has returned completely to the first position.

Preferably, the push button 12 for opening the transport case is secured by a lock 9 which may be operated by an associated key. In the position of the key illustrated in FIG. 5, the lock 9 prevents the push button 12 from being pushed through the rear wall 8. In other words, the retaining member 10 cannot be shifted upwardly to open the transport case. In the position of the key illustrated in FIGS. 6A, 6B, 7A and 7B, the lock 9 allows the push button 12 to be pushed through the rear wall 8 to release the retaining member 10 and to open the transport case. Preferably, the lock receiving the key is arranged such that the key has to be rotated through a large angle, e.g. approximately 90°, in order to switch the lock from the locked state to the unlocked state. In this manner, slight rotation of the key cannot change the locking state inadvertently. Further, if the angle is chosen to be approximately 90°, the unlocking position of the key is transverse to the locking position of the key, which makes it particularly easy and reliable for the user to distinguish the positions of the key and, thus, to recognise the current state and function of the lock.

According to the embodiment depicted in FIG. 5, for example, the base part 1 (bottom shell) is fitted horizontally to the support structure 3 of the motorbike. The support structure 3 may be formed by a rack of the motorbike itself or by a standardised carrier plate additionally mounted on (possibly retrofitted to) the motorbike. The support structure 3 and base part 1 are arranged to mate each other so that the base part 1 can be fitted and secured to the support structure 3. To this end, the support structure 3 may comprise a conventional fitting extension 4 protruding vertically from the upper surface of the support structure 3 and adapted to be received in a base aperture 16 of the bottom wall of the base part 1, as shown in FIGS. 3 and 5, for example. A latch 6 is provided above the bottom aperture 16 in base part 1 and biased by at least one compression spring 5 to catch the fitting extension 4 in the bottom aperture 16. A (second) push button 7 may be arranged to urge the latch 6 away from the fitting extension 4 so that the transport case is released from the support structure 3.

A locking mechanism may be provided to lock the latch 6 in the position catching the fitting extension 4 so that the transport case TC cannot be detached from the support structure 3 by an unauthorised person. In a preferred embodiment, it is the lock 9 that serves not only to lock the push button 12 for opening the transport case but also to lock the transport case to the fitting extension 4 of a motorbike or carrier plate to which the transport case may be fitted. In the situation shown in FIG. 5, the lock 9 prevents both push buttons 7 and 12 from moving in their respective guide structures. When the key is rotated through 90° (FIGS. 6A and 8A), each of the push buttons 7 and 12 can be depressed. Pushing button 7 releases latch 6 from fitting extension 4 so that the transport case can be detached from the support structure 3 of the motorbike (FIG. 8B).

Generally, either a horizontal or a vertical wall of the base part may be fitted to the motorbike. The wall of the base part fitted to the motorbike constitutes the "bottom portion" within the meaning of the preceding description. Therefore, the term "bottom portion" is not limited to a lower horizontal wall of the base part. Further, the base part and lid part may be arranged either above or beside each other, with the base part being mounted to a support structure (e.g. the rack or an intermediate carrier plate) of the motorbike and the lid part being pivotable with respect to the base part.

Some details of the construction and operation will be described more specifically. The two-position lock 9 comprises an inner lock part 13. The upper part of rear wall 8 carries two wings 20 provided with openings; in these openings there is inserted a pin around which are hinged the opening button 12 and a small connecting rod 11. When the system is mounted, the opening button 12 is visible from outside since it protrudes from an opening 21 in the rear wall 8. The small connecting rod 11 has two pairs of holes; through the first pair of holes 22 passes the pin around which is hinged also the opening button 12, while in the second pair of holes 23 is inserted another pin to which is hinged the retaining member 10. In the upper part of the retaining member 10 there is a tooth 24 which fits a counter-tooth 25 in the lid part 2 and permits the closure of the topcase. The closing mechanism is also provided with two torsion springs 14 and 15 which support the operation; the spring 14 is fixed between the rear wall 8 and the small connecting rod 11 while the spring 15 is fixed between the small connecting rod 11 and the retaining member 10.

Operation of the closure system will be recapitulated now. As stated earlier, the closing mechanism is provided with a lock 9 preferably having a two-position key, which thus permits two different forms of use of the closing mechanism.

A. Locked position

With the key in vertical position, the lock is in closed position (see FIG. 5), and this makes it impossible to open the transport case and to detach it from the support structure on the motorcycle. The transport case cannot be opened because ribs 26 and 27 of the inner lock 13 act respectively on a tooth 28 of the opening button 12 and a tooth 29 of the small connecting rod 11. In particular the interference between the rib 26 and the tooth 28 prevents operation of the opening button 12 and consequently does not allow any movement of the retaining member 10 and of the small connecting rod 11 connected to the retaining member 10. The locking of the rib 27 on the tooth 29 and consequently of the small connecting rod 11 is an important feature because it is the movement of the small connecting rod that allows the complete movement of the retaining member 10. This condition (key in locking position) therefore prevents the movement of the retaining member 10 which, fitting its tooth 24 with the counter-tooth 25 in the lid part 2, permits the closing of the transport case. Detachment of the transport case from the support structure is prevented because a rib 30 of the inner lock 13 interferes with a rib 31 on the detaching button 7; owing to this, the button 7 cannot slide freely in a space 17 of the base part 1 and, thus, cannot release the fitting extension 4 from the locking function of the hook 32 of the latch bolt 6. As the fitting extension 4 is firmly held inside the bottom shell 1 and at the same time forms an integral part of the supporting plate 3, the transport case is secured to the motorcycle.

B. Unlocked position (key turned about 90°)

The unlocked position is obtained by turning the key about 90° from the locked position (see e.g. FIG. 6A); positioning of the key is ensured by a spring system which allows the user to immediately identify the principal positions of the key (0° and 90° positions). When the key is in the open position, it is possible to both open and detach the transport case from the supporting plate. Turning of the key results in the following operations:

(a) The inner lock 13 is turned and therefore terminates the blocking effect of the rib 30 on the rib 31 of the button 7 so that the latter slides freely inside the space 17 of the bottom shell. Exerting force on a zone 33 of the button 7 (see FIG. 9B), to overcome the opposite reaction of the button spring(s) 5, the latch bolt 6 moves towards the interior part, releasing the fitting extension 4 from the interfering hook 32 and thus enabling the detachment of the topcase from the supporting plate 3 and consequently from the motorcycle (see FIG. 8B).

(b) The rotation of the inner lock 13 releases the locking between the inner lock 13 and the small connecting rod 11, and between the inner lock 13 and the opening button 12 (more specifically, the locking action between teeth 27 and 29 and between teeth 26 and 28 is released). Thanks to this, acting on part 34 of the opening button 12 (see FIG. 9B), the push button 12 may rotate around the pin which passes through the wings 20 and push with its end 35 against the inside wall of the retaining member 10. The latter, set in movement by the opening button 12 moves also the small connecting rod 11 to which it is connected through the pin inserted into the holes 23 and 36. The rest of the movement is ensured by the release action of the torsion spring 14 fixed between the rear wall 8 and the small connecting rod 11; the spring allows a 60° rotation of the small connecting rod which brings the retaining member 10 into the final open position (see FIGS. 6A and 6B). In this condition, the tooth 25 of the lid part 2 is no longer held by the tooth 24 of the retaining member 10 and the user can open the transport case lifting the lid part (or top shell) 2. The vertical position of the retaining member 10, once open, is kept thanks to the interference between a rib 41 of the retaining member 10 and a rib 42 of the small connecting rod 11; in order to improve the effect, a torsion spring 15 has been inserted and fixed between the small connecting rod 11 and the retaining member 10.

To close the transport case, it is necessary to proceed as shown in FIGS. 7A and 7B. Tilt the retaining member 10 until it touches the external wall of the top shell 2 (see FIG. 7A), then push it down causing the rotation of the small connecting rod 11 around the pin which passes through the wings 20 (see FIG. 7B) until the closing mechanism is again in the position as shown in FIG. 6A. To definitely close the transport case, turn the key (bringing it back into vertical position) in order to restore the condition shown in FIG. 5. In order to avoid possible jamming of the closing mechanism, some specific features have been applied to the top shell 2 and the retaining member 10. The top shell 2 has a rib 37 while the retaining member 10 has been reduced along the sides 38; this reduction does not concern the tooth 24. Owing to these devices, once the tooth engages the top shell it is forced to a correct closing while in case of wrong engagement the retaining member 10 returns into vertical position. In addition, the retaining member 10 has a further rib 39, if the engagement is not correct this rib interferes with the upper part 40 of the rear wall 8 bringing the retaining member 10 back to vertical position.

List of Reference Signs

TC transport case (top case)
1 base part (bottom shell) of the transport case
2 lid part (top shell) of the transport case
3 support structure (motorbike rack; carrier plate)
4 fitting extension
5 latch spring
6 latch (bolt)
7 detaching button
8 rear wall
9 lock with key
10 retaining member
11 connecting rod
12 opening push button
13 inner lock
14 torsion spring(s) between small connecting rod and rear wall
15 torsion spring(s) between small connecting rod and retaining member
16 base aperture (bottom aperture)
17 space
18 locking plate
19 handle
20 wings
21 opening of rear wall 8
22 pair of holes
23 pair of holes
24 tooth
25 counter-tooth
26 ribs of the inner lock 13
27 ribs of the inner lock 13
28 tooth of the opening button 12
29 tooth of the connecting rod 11
30 rib of the inner lock 13
31 rib on the detaching button 7
32 hook of the latch 6
33 end zone of the detaching button 7
34 part of the opening button 12
35 end of the opening button 12
36 holes
37 rib of the lid part 2
38 sides of retaining member 10
39 rib of retaining member 10
40 upper part of the rear wall 8
41 rib of the retaining member 10
42 rib of the connecting rod 11

What is claimed is:

1. A motorbike transport case comprising:
a base part arranged to be detachably fitted to a motorbike or a carrier plate mounted on a motorbike;
a lid part hinged to the base part such that the lid part can be pivoted away from the base part to open the transport case and pivoted toward the base part to close the transport case;
a retaining member arranged to selectively assume a first position, in which the retaining member can hold the lid part to the base part, and a second position, in which the retaining member cannot hold the lid part to the base part; and
a control mechanism for bringing the retaining member from the first position to the second position;
wherein the control mechanism comprises a pushbutton which is arranged to be depressed to enable the retaining member to be brought from the first position to the second position;
wherein the control mechanism allows the retaining member to be brought from the second position to the first position only in such a manner that the retaining member actually holds the lid part to the base part when the retaining member has reached the first position;
wherein the retaining member is arranged to be returned automatically to the second position if the transport ease has not been closed properly.

2. The motorbike transport case according to claim 1, wherein:
the retaining member is secured to the base part and engages the lid part when the retaining member is in the first position;
the retaining member is arranged to release the lid part when the retaining member is in the second position.

3. The motorbike transport ease according to claim 2, wherein the retaining member comprises a hook-shaped or tooth-shaped end adapted to engage an edge of the lid part.

4. The motorbike transport case according to claim 2, wherein:
the retaining member is articulated to the base part;
the retaining member in its second position can be pivoted towards the lid part to engage the lid part, and can be pivoted away from the lid part to release the lid part;

the control mechanism allows the retaining member to be brought from the second position to the first position only when the retaining member has been pivoted towards the lid part.

5. The motorbike transport case according to claim 1, wherein the pushbutton is in a first state when the retaining member is in the first position; and the pushbutton is in a second state when the retaining member is in the second position.

6. The motorbike transport ease according to claim 5, wherein:

the pushbutton is arranged to bring the retaining member from the first position to the second position when the pushbutton is brought from the first state to the second state;

the control mechanism is arranged to bring the pushbutton from the second state to the first state, preferably including a snap action, when the retaining member is brought from the second position to the first position.

7. The motorbike transport case according to claim 1, further comprising a lock, preferably operable by a key, for selectively locking and unlocking the control mechanism or the pushbutton acting on the control mechanism.

8. The motorbike transport case according to claim 1 further comprising:

a wall portion of the base part comprises an aperture for receiving a fitting extension of a support structure of a motorbike;

the base part comprises a fitting latch arranged to couple the base part to a received fitting extension; and the base part comprises a detaching means, in particular a push button, arranged to release the fitting latch from a received fitting extension.

9. The motorbike transport case according to claim 8, wherein the detaching means is separate from the pushbutton.

10. The motorbike transport case according to claim 8, further comprising:

a lock is arranged to selectively lock and unlock the control mechanism, or the pushbutton acting on the control mechanism; and the fitting latch, or the detaching means acting on the filling latch.

* * * * *